(12) United States Patent
Beak et al.

(10) Patent No.: US 12,657,912 B2
(45) Date of Patent: Jun. 16, 2026

(54) COMPUTER SYSTEM FOR DETECTING TARGET VIDEO FROM SPORTS VIDEO BASED ON VOICE RECOGNITION AND METHOD OF THE SAME

(71) Applicant: NAVER CORPORATION, Seongnam-si (KR)

(72) Inventors: Jun Bong Beak, Seongnam-si (KR); Sanggeun Park, Seongnam-si (KR); Dong Ho Lee, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 335 days.

(21) Appl. No.: 17/820,916

(22) Filed: Aug. 19, 2022

(65) Prior Publication Data

US 2023/0069720 A1 Mar. 2, 2023

(30) Foreign Application Priority Data

Aug. 31, 2021 (KR) ........................ 10-2021-0115248

(51) Int. Cl.
*G06V 20/40* (2022.01)
*G06V 20/62* (2022.01)
*G10L 15/26* (2006.01)

(52) U.S. Cl.
CPC .............. *G06V 20/42* (2022.01); *G06V 20/44* (2022.01); *G06V 20/63* (2022.01); *G10L 15/26* (2013.01)

(58) Field of Classification Search
CPC ........ G06V 20/42; G06V 20/44; G06V 20/63; G10L 15/26; G10L 25/57
See application file for complete search history.

(56) References Cited

U.S. PATENT DOCUMENTS

| | | | | |
|---|---|---|---|---|
| 8,140,327 | B2 * | 3/2012 | Kennewick | G10L 15/1822 704/226 |
| 9,817,883 | B2 * | 11/2017 | Barthel | G06F 16/285 |
| 10,104,345 | B2 * | 10/2018 | Masood | G06V 20/46 |
| 11,330,346 | B1 * | 5/2022 | Duraiswamy | H04N 21/432 |
| 11,899,637 | B2 * | 2/2024 | Barthel | G06F 16/48 |
| 12,003,829 | B2 * | 6/2024 | Baek | G06V 20/42 |
| 2007/0294716 | A1 * | 12/2007 | Jeong | H04N 5/76 725/18 |
| 2012/0219271 | A1 * | 8/2012 | Vunic | G06V 20/49 704/235 |
| 2015/0181301 | A1 * | 6/2015 | Bloch | H04N 21/4532 725/41 |
| 2017/0263285 | A1 * | 9/2017 | Yabuki | A63B 71/0622 |

(Continued)

FOREIGN PATENT DOCUMENTS

KR 1020210067874 A 6/2021

OTHER PUBLICATIONS

Yuncheol Choi et al.; Highlight point recommendation system for summarizing esports broadcast video; DBpia; www.dbpia.co.kr; 2020; pp. 358-360.

(Continued)

*Primary Examiner* — Wesley J Tucker
(74) *Attorney, Agent, or Firm* — Greer Burns & Crain Ltd.

(57) ABSTRACT

A computer system for detecting a target video from a sports video based on voice recognition is configured to convert a relay voice corresponding to a sports video to text; and to detect a target video related to a preset event from the sports video based on the text.

17 Claims, 6 Drawing Sheets

(56) References Cited

U.S. PATENT DOCUMENTS

| | | | | |
|---|---|---|---|---|
| 2018/0108380 A1* | 4/2018 | Packard | .............. | H04N 21/2668 |
| 2018/0199080 A1* | 7/2018 | Jackson, Jr. | ........ | H04N 21/2187 |
| 2018/0350144 A1* | 12/2018 | Rathod | .............. | G06Q 20/3224 |
| 2019/0043500 A1* | 2/2019 | Malik | ................. | H04N 21/2187 |
| 2021/0224547 A1* | 7/2021 | Scott | ................... | H04N 21/8133 |
| 2022/0121884 A1* | 4/2022 | Zadeh | .................... | G06N 3/006 |
| 2023/0068527 A1* | 3/2023 | Mahlmeister | ........... | A63F 13/54 |
| 2023/0154008 A1* | 5/2023 | Scott | ................ | H04N 21/26603 |
| | | | | 382/224 |
| 2023/0281989 A1* | 9/2023 | Scott | ...................... | G06V 20/42 |
| | | | | 382/224 |
| 2024/0062545 A1* | 2/2024 | Nabeto | .................... | H04N 5/91 |

OTHER PUBLICATIONS

Korean Office Action issued in corresponding to Korean patent application No. 10-2021-0115248, dated Feb. 17, 2023.

\* cited by examiner

FIG. 2

Processor (150)

Video detection module
(251)

Voice recognition module
(253)

Target verification module
(257)

FIG. 3

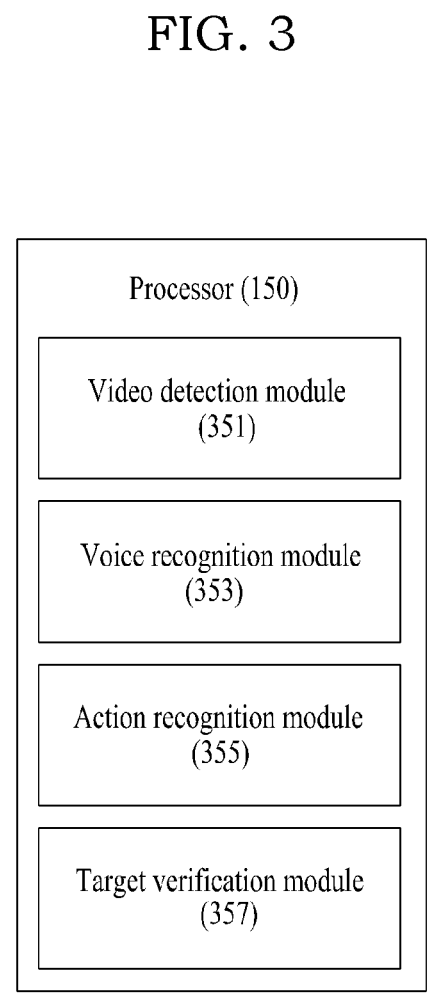

Processor (150)

Video detection module
(351)

Voice recognition module
(353)

Action recognition module
(355)

Target verification module
(357)

COMPUTER SYSTEM FOR DETECTING TARGET VIDEO FROM SPORTS VIDEO BASED ON VOICE RECOGNITION AND METHOD OF THE SAME

CROSS-REFERENCE TO RELATED APPLICATION(S)

This U.S. non-provisional application claims the benefit of priority under 35 U.S.C. § 119 to Korean Patent Application No. 10-2021-0115248 filed on Aug. 31, 2021, in the Korean Intellectual Property Office (KIPO), the entire contents of which are incorporated herein by reference.

BACKGROUND OF THE INVENTION

Field of Invention

One or more example embodiments of the following description relate to a computer system for detecting a target video from a sports video based on voice recognition and a method thereof.

Description of Related Art

In general, sports videos related to sports games are provided. Here, there are user demands for a target video related to a specific event that occurs during a sports game. Therefore, the target video is detected from a sports video based on an action recognition and provided to a user. However, the target video detected in this manner may have low accuracy.

BRIEF SUMMARY OF THE INVENTION

One or more example embodiments provide a computer system that may detect a target video from a sports video with high accuracy and a method thereof.

One or more example embodiments provide a computer system that may detect a target video from a sports video based on voice recognition and a method thereof.

According to an aspect of at least one example embodiment, there is provided a method of a computer system, including converting a relay voice corresponding to a sports video to text during a sports game; and detecting a target video related to a preset event from a location in a sports video based on the text.

According to an aspect of at least one example embodiment, there is provided a non-transitory computer-readable recording medium storing instructions that, when executed by a processor, cause the processor to perform the method.

According to an aspect of at least one example embodiment, there is provided a computer system including a memory; and a processor configured to connect to the memory and to execute at least one instruction stored in the memory. The processor is configured to convert a relay voice corresponding to a sports video to text during a sports game, and to detect a target video related to a preset event from the sports video based on the text.

According to some example embodiments, a target video may be detected from a sports video with high accuracy. That is, a computer system may exhibit higher accuracy than using only an action recognition by using voice recognition in detecting a target video for a preset event. Here, the computer system may exhibit higher accuracy by using a combination of voice recognition and action recognition in detecting the target video for the preset event. Accordingly, user demands that desire a target video may be met with higher satisfaction.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein:

FIG. 2 is a block diagram illustrating an example of a processor of a computer system for detecting a target video from a sports video according to one example embodiment;

FIG. 3 is a block diagram illustrating an example of a processor of a computer system for detecting a target video from a sports video according to another example embodiment;

Figure 1:
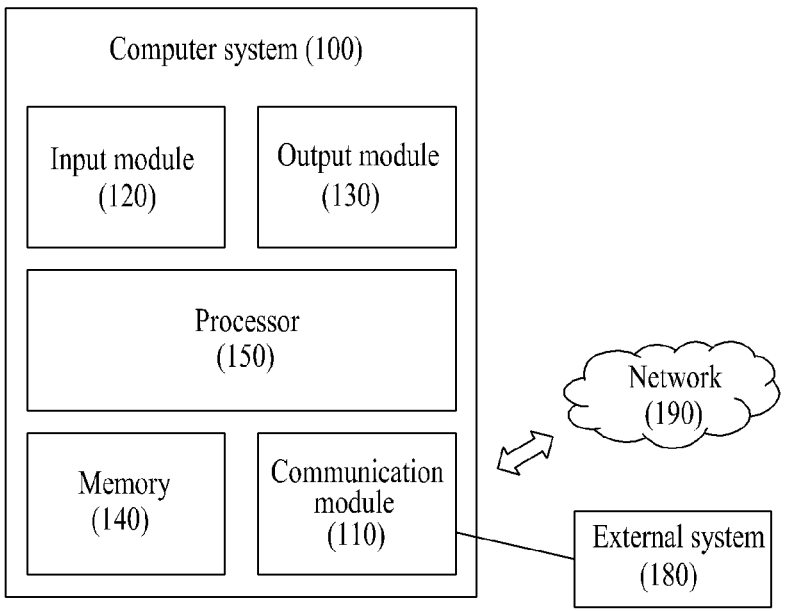
FIG. 1 is a block diagram illustrating an example of a computer system according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flow-chart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices.

The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

Herein, the term "event" may represent an action or a notable play (e.g., plays that may be exciting, exceptional, controversial, entertaining, etc.) that occurs during a sports game. For example, the sports game may include baseball, soccer, volleyball, golf, and the like. For example, when the sports game is baseball, an event may include a notable defensive play, pitch, homerun, hit, or scoring. As another example, when the sports game is soccer, an event may include an exceptional defense, scoring, or shooting.

Here, the term "sports video" may represent video data of a broadcasted and/or recorded sports game. Here, the term "target video" may be generated from a sports video and may include at least one unit video, i.e., a portion or section of the sports video, that is associated with at least one event. Here, the term "relay voice" may represent a voice signal generated in real-time or simultaneously with certain occurrences during the sports game. For example, a relay voice may include a voice signal of at least one of an announcer and a commentator. Here, the term "text relay data" may represent text data generated in real-time or simultaneously with certain occurrences during the sports game. Here, the text relay data may refer to details of events and may include, for example, identification information and an actual point in time of each of the events.

FIG. 1 is a diagram illustrating a configuration of a computer system 100 according to at least one example embodiment.

Referring to FIG. 1, the computer system 100 according to at least one example embodiment may include at least one of a communication module 110, an input module 120, an output module 130, a memory 140, and a processor 150. In some example embodiments, at least one component may be omitted from among components of the computer system 100 and at least one another component may be added thereto. In some example embodiments, the computer system 100 may be configured as a circuitry in which at least two of the components of the processor 150 are integrated into one. Here, the computer system 100 may include at least one device. Each device may be one of, for example, a server, an electronic device, a satellite, and a base station. For example, the electronic device may include at least one of a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a home appliance, a medical device, and a robot. In some example embodiments, when the computer system 100 includes a plurality of devices, the components of the computer system 100 may be configured in one of the devices or may be configured to be distributed over at least two of the devices.

The communication module 110 enables the computer system 100 to communicate with an external system 180. The communication module 110 may establish a communication channel between the computer system 100 and the external system 180 and may communicate with the external system 180 through the communication channel. Here, the communication module 110 may include at least one of a wired communication module and a wireless communication module. The wired communication module may be connected to the external system 180 in a wired manner and may communicate with the external system 180 in the wired manner. The wireless communication module may include at least one of a near field communication module and a far field communication module. The near field communication module may communicate with the external system 180 using a near field communication method. For example, the near field communication method may include at least one of Bluetooth, wireless fidelity (WiFi) direct, and infrared data association (IrDA). The far field communication module may communicate with the external system 180 using a far field communication method. Here, the far field communication module may communicate with the external system 180 over a network 190. For example, the network 190 may include at least one of a cellular network, the Internet, and a computer network such as a local area network (LAN) and a wide area network (WAN). Here, the external system 180 may include at least one device and each device may be one of, for example, a server, an electronic device, a satellite, and a base station. For example, the electronic device may include at least one of a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a home appliance, a medical device, and a robot.

The input module 120 may input a signal to be used by at least one component of the computer system 100. The input module 120 may include at least one of an input device configured for the user to directly input a signal to the computer system 100, a sensor device configured to detect an ambient environment and to create a signal, and a camera module configured to capture a video and to create video data. For example, the input device may include at least one of a microphone, a mouse, and a keyboard. In some example embodiments, the sensor device may include at least one of a touch circuitry configured to detect a touch and a sensor circuitry configured to measure strength of force occurring due to the touch.

The output module 130 may output information. The output module 130 may include at least one of a display module configured to visually display information and an audio module configured to auditorily reproduce information. For example, the display module may include at least one of a display, a hologram device, and a projector. For example, the display module may be configured as a touch-screen in an assembly along with at least one of the sensor circuitry and the touch circuitry of the input module 120. For example, the audio module may include at least one of a speaker and a receiver.

The memory 140 may store a variety of data used by at least one component of the computer system 100. For example, the memory 140 may include at least one of a volatile memory and a non-volatile memory. Data may include at least one program and input data or output data related thereto. The program may be stored in the memory 140 as software including at least one instruction and may include, for example, at least one of an OS, middleware, and an application. According to at least one example embodiments, the memory 140 may store at least one keyword related to a preset event.

The processor 150 may control at least one component of the computer system 100 by executing a program of the memory 140. Through this, the processor 150 may perform data processing or operation. Here, the processor 150 may execute an instruction stored in the memory 140. According to at least one example embodiment, the processor 150 may detect a target video related to a preset event from a sports video related to the sports game, based on voice recognition. Here, the processor 150 may convert a relay voice corresponding to the sports video in the sports game to text. The processor 150 may detect the target video from the sports video based on the text. To this end, the processor 150 may analyze the text using the at least one stored keyword. According to an example embodiment, the processor 150 may detect the target video from the sports video based only on voice recognition. In this case, the processor 150 may be configured as described below with reference to FIG. 2. According to another example embodiment, the processor 150 may detect the target video from the sports video based on motion recognition as well as voice recognition. In this case, the processor 150 may be configured as described below with reference to FIG. 3. Through these embodiments, the processor 150 may provide the target video for a user. According to an example embodiment, the processor 150 may provide an individual target video. According to another example embodiment, the processor 150 may combine a plurality of target videos into, for example, a highlight video and may provide the same.

Figure 2:
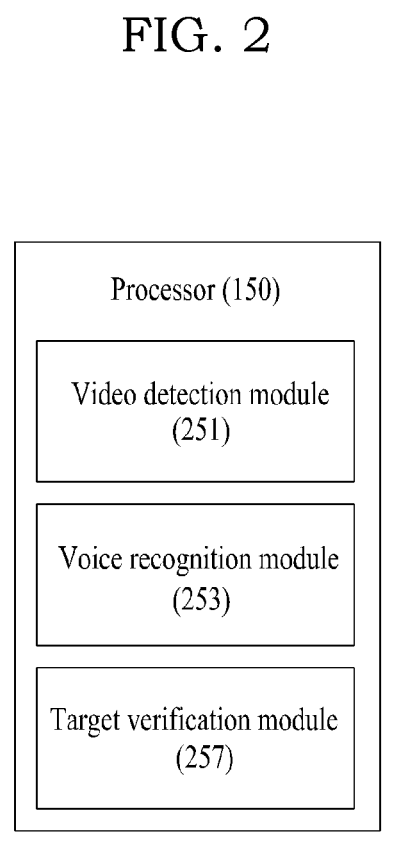

FIG. 2 is a diagram illustrating an example of the processor 150 of the computer system 100 according to a first example embodiment.

Referring to FIG. 2, the processor 150 of the first example embodiment may include a video detection module 251, a voice recognition module 253, and a target verification module 257. Although not illustrated, at least one another component may be added to the processor 150. At least two of the components of the processor 150 may be configured as a single integrated circuitry.

The video detection module 251 may detect a partial video from a sports video of a sports game. In detail, the video detection module 251 may extract chunk videos from the sports video in predetermined (or, alternatively, desired) time units and may generate a partial video that includes at least one of the chunk videos. Here, the time unit may be, for example, 1 minute. For example, when the sports game is baseball, the video detection module 251 may detect a partial video related to a play resulting in a player being called out. Here, the video detection module 251 may detect the partial video from the sports video based on text relay data. For example, the video detection module 251 may recognize a score board from each of the chunk videos, may map the text relay data and the chunk videos, and may generate at least one chunk video that is determined based on the text relay data, as a partial video.

The voice recognition module 253 may convert a relay voice corresponding to the partial video to text. In detail, the voice recognition module 253 may extract the relay voice corresponding to the partial video. Here, since an audio signal corresponding to the partial video includes a noise signal, such as cheering sound from the fans, in addition to the relay voice, the voice recognition module 253 may extract the relay voice from the audio signal corresponding to the partial video using a noise filter for removing the noise signal. The voice recognition module 253 may convert the relay voice to text. For example, when the sports game is baseball, the voice recognition module 253 may convert a voice signal of at least one of an announcer and a commentator to text, based on a partial video related to a play resulting in an out call. For example, the voice recognition module 253 may convert the relay voice to text using a CLOVA speech recognition (CSR) model. Here, to more accurately recognize an inaccurate pronunciation and the like, the voice recognition module 253 may be trained using terms related to the sports game. That is, the voice recognition module 253 may be trained using the relay voice of sports games played in the past. For example, when the sports game is baseball, the voice recognition module 253 may be trained using the relay voice of a plurality of partial videos related to a plurality of events involving out plays.

The target verification module 257 may verify whether the partial video is appropriate as a target video related to a preset event. To this end, the target verification module 257 may determine whether the text includes a preset number of keywords. Here, the preset number may be 1 or more. Here, the keyword may be selected from the relay voice corresponding to the plurality of target videos detected with respect to sports games played in the past. Here, although the preset event is not directly indicated, a term frequently used by an announcer or a commentator may be selected as a keyword in response to previous target videos. For example, when the sports game is baseball, the preset event may be a notable defensive play. In this case, the keyword may be selected such that an unremarkable defensive play and a notable defensive play may be clearly distinguishable. The keyword may include, for example, "fantastic defense" and "nice catch." When the text includes a preset number of keywords, the target verification module 257 may detect the partial video as the target video. Also, when the text does not include the preset number of keywords, the target verification module 257 may exclude the partial video. For example, the preset number may be 2. In this case, if the text includes two or more keywords, the target verification module 257 may detect the partial video as the target video. Also, if the text includes only a single keyword, the target verification module 257 may exclude the partial video.

FIG. 3 is a diagram illustrating an example of the processor 150 of the computer system 100 according to a second example embodiment and a third example embodiment.

Referring to FIG. 3, the processor 150 of the second example embodiment and the third example embodiment may include a video detection module 351, a voice recognition module 353, an action recognition module 355, and a target verification module 357. Although not illustrated, at least one other component may be added to the processor 150. The processor 150 may be implemented as a circuitry in which at least two of the components of the processor 150 are integrated into one. Here, the video detection module 351 and the voice recognition module 353 of the processor 150 of the second example embodiment and the third example embodiment are substantially similar to the video detection module 251 and the voice recognition module 253 of the processor 150 of the first example embodiment and thus, further description is omitted.

The action recognition module 355 may recognize an action, i.e., movements or motion, of at least one object from a partial video. For example, the object may include a person or a thing, such as a ball, a bat, and the like. In detail, the action recognition module 355 may identify each object from the partial video and may track an action of the object. For example, the action recognition module 355 may recognize an action of the object using an artificial intelligence (AI) module or a rule-based algorithm, such as a TensorFlow object detection model.

The target verification module 357 may verify whether the partial video is appropriate as a target video related to a preset event. To this end, the target verification module 357 may determine whether text converted from a relay voice includes a preset number of keywords. Here, the preset number may be 1 or more. Also, the target verification module 357 may determine whether an action of the object corresponds to a preset motion. According to the second example embodiment, when the text includes the preset number of keywords, the target verification module 357 may determine whether the action of the object corresponds to the preset motion. According to the third example embodiment, when the action of the object corresponds to the preset motion, the target verification module 357 may determine whether the text includes the preset number of keywords. Here, a preset range of motion of the object in the third example embodiment may be identical to or different from that in the second example embodiment. Here, the preset range of motion of the object in the third example embodiment may be relatively defined in more detail and the preset range of motion in the second example embodiment may be defined in less detail. If the text includes the preset number of keywords and the action of the object corresponds to the preset motion, the target verification module 357 may determine that the partial video is the target video. Also, unless the text includes the preset number of keywords or unless the action of the object corresponds to the preset motion, the target verification module 357 may exclude the partial video.

Figure 4:
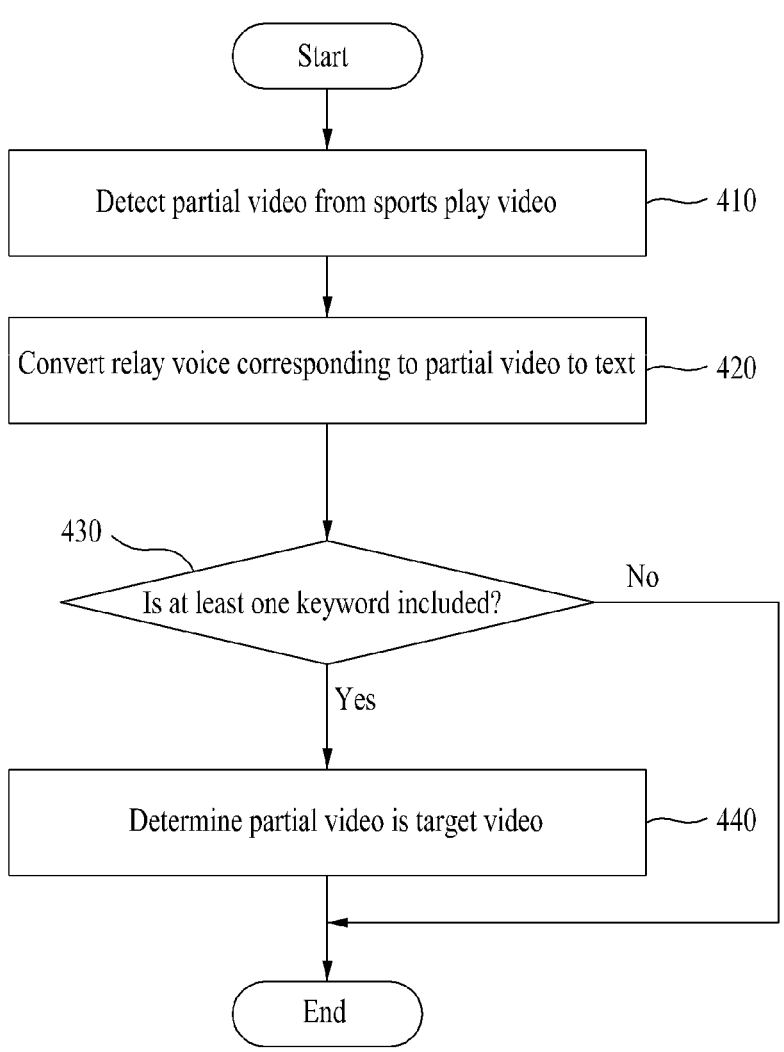
FIG. 4 is a flowchart illustrating an example of a method of a computer system for detecting a target video from a sports video according to one example embodiment.

FIG. 4 is a flowchart illustrating an example of a method of the computer system 100 according to the first example embodiment. According to the first example embodiment, the processor 150 of the computer system 100 may be configured as illustrated in FIG. 2.

Referring to FIG. 4, in operation 410, the computer system 100 of the first example embodiment may detect a partial video from a sports video of a sports game. In detail, the processor 150 may extract chunk videos from the sports video in predetermined (or, alternatively, desired) time units and may generate a partial video that includes at least one of the chunk videos. Here, the time unit may be, for example, 1 minute. For example, when the sports game is baseball, the processor 150 may detect a partial video related to a play involving an out. Here, the processor 150 may detect the partial video from the sports video based on text relay data. For example, the processor 150 may recognize a score board from each of the chunk videos, may map the text relay data and the chunk videos, and may generate at least one chunk video that is determined based on the text relay data, as a partial video.

In operation 420, the computer system 100 may convert a relay voice corresponding to the partial video to text. In detail, the processor 150 may extract the relay voice corresponding to the partial video. Here, since an audio signal corresponding to the partial video includes a noise signal, such as cheering sound from the fans, in addition to the relay voice, the processor 150 may extract the relay voice from the audio signal corresponding to the partial video using a noise filter for removing the noise signal. The processor 150 may convert the relay voice to text. For example, when the sports game is baseball, the processor 150 may convert a voice signal of at least one of an announcer and a commentator to text, based on a partial video related to a play resulting in an out. For example, the processor 150 may include the voice recognition module 253 and the voice recognition module 253 may convert the relay voice to the text using a CSR model. Here, to more accurately recognize an inaccurate pronunciation and the like, the voice recognition module 253 may be trained using terms related to the sports game. That is, the voice recognition module 253 may be trained using the relay voice of sports games played in the past. For example, when the sports game is baseball, the voice recognition module 253 may be trained using the relay voice of a plurality of partial videos related to a plurality of events involving out plays, respectively.

In operation 430, the computer system 100 may verify whether the partial video is appropriate as a target video related to a preset event. In detail, the processor 150 may determine whether the text includes a preset number of keywords. Here, the preset number may be 1 or more. Here, the keyword may be stored in the memory 140. The keyword may be selected from the relay voice corresponding to a plurality of target videos detected with respect to sports games played in the past. Here, although the preset event is not directly indicated, a term frequently used by an announcer or a commentator may be selected as a keyword in response to previous target videos. For example, when the sports game is baseball, the preset event may be a notable defensive play. In this case, the keyword may be selected such that an unremarkable defensive play and a notable defensive play may be clearly distinguishable. The keyword may include, for example, "fantastic defense" and "nice catch."

When the partial video is determined to include the present number of keywords in operation 430, the computer system 100 may determine the partial video to be the target video in operation 440. Thus, when the relay voice corresponding to the partial video includes contents related to the preset event, the processor 150 may determine that the partial video is the target video. When it is determined that the text does not include the preset number of keywords in operation 430, the processor 150 may exclude the partial video.

In this manner, the computer system 100 may detect at least one target video and may provide the target video for the user. According to an example embodiment, the processor 150 may provide an individual target video. According to another example embodiment, the processor 150 may combine a plurality of target videos into, for example, a highlight video and may provide the same.

Figure 5:
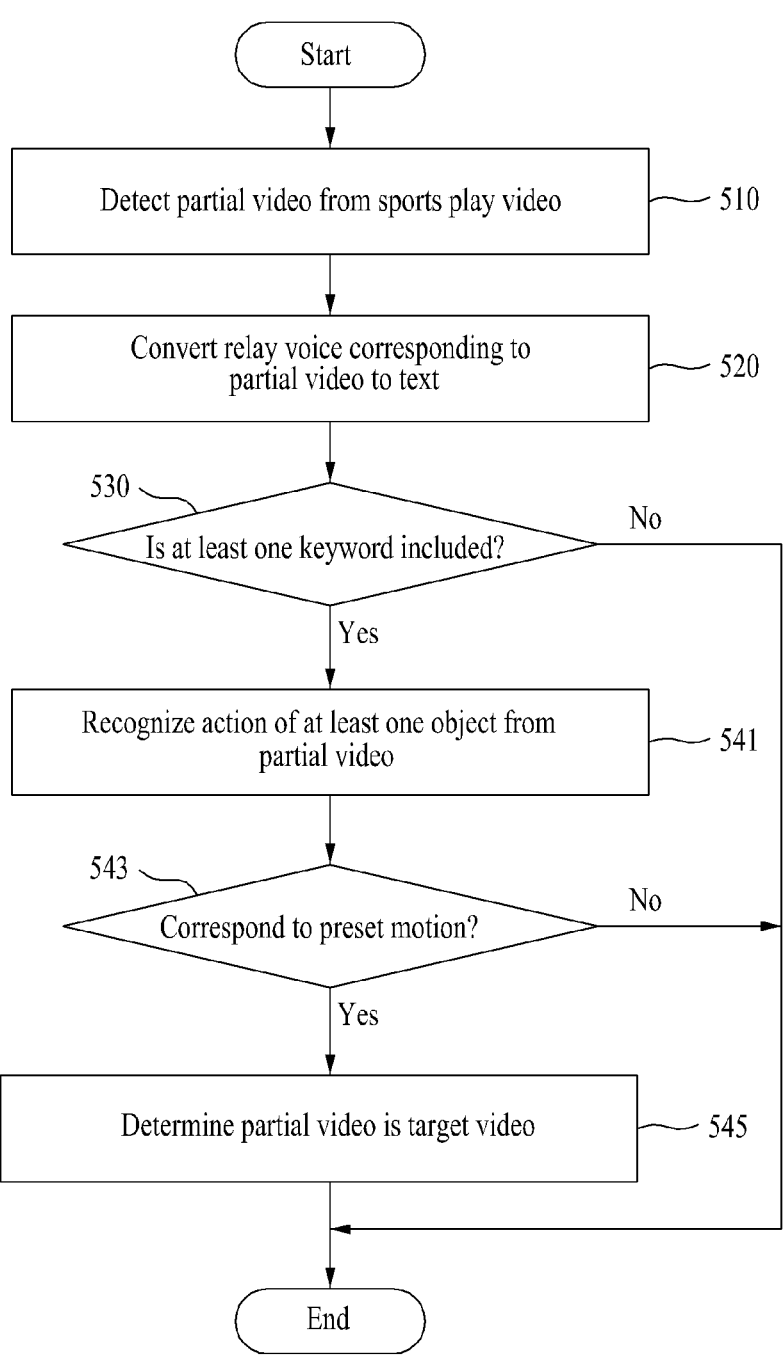
FIG. 5 is a flowchart illustrating an example of a method of a computer system for detecting a target video from a sports video according to another example embodiment.

FIG. 5 is a flowchart illustrating an example of the method of the computer system 100 according to the second example embodiment. According to the second example embodiment, the processor 150 of the computer system 100 may be configured as illustrated in FIG. 3.

Referring to FIG. 5, in operation 510, the computer system 100 of the second example embodiment may detect a partial video from a sports video of a sports game. In operation 520, the computer system 100 may convert a relay voice corresponding to the partial video to text. In operation 530, the computer system 100 may verify whether the partial video is appropriate as a target video related to a preset event. In detail, the processor 150 may determine whether the text includes a preset number of keywords. Here, operations 510, 520, and 530 of the second example embodiment are substantially similar to operations 410, 420, and 430 of the first example embodiment and thus, further description is omitted.

According to the second example embodiment, although the partial video is determined to be appropriate as the target video in operation 530, the computer system 100 may verify again whether the partial video is appropriate as the target video. This is because the relay voice corresponding to the partial video may include contents related to a previous event, not contents related to a current partial video. For example, when the sports game is baseball and the preset event is a notable defensive play, the relay voice may include contents related to a previous notable defensive play by an announcer or a commentator.

In detail, when the partial video is determined to be appropriate as the target video in operation 530, the computer system 100 may recognize an action of at least one object from the partial video in operation 541. For example, the object may include a person or a thing. For example, when the sports game is baseball, the processor 150 may recognize an action of at least one of a pitcher, a batter, a first baseman, a second baseman, a shortstop, a third baseman, a right fielder, a center fielder, and a left fielder. In detail, the processor 150 may identify each object from the partial video and may track an action of the object. For example, the processor 150 may recognize an action of the object using an AI module or a rule-based algorithm, such as a TensorFlow object detection model.

In operation 543, the computer system 100 may verify again whether the partial video is appropriate as the target video related to the preset event. In detail, the processor 150 may determine whether the action of the object corresponds to a preset motion. For example, the processor 150 may determine whether a combination of actions of objects corresponds to the preset motion.

When the partial video is determined to be appropriate as the target video in operation 543, the computer system 100 may determine that the partial video is the target video in operation 545. In detail, when the action of the object is determined to correspond to the preset motion in operation 543, the processor 150 may detect the partial video as the target video. Through this, only when the relay voice corresponding to the partial video includes contents related to the preset event and also the action of the object represents the motion related to the preset event, the processor 150 may determine the partial video is the target video.

When the text does not include the preset number of keywords in operation 530, the processor 150 may exclude the partial video. Through this, when the relay voice corresponding to the partial video does not include the contents related to the preset event, the processor 150 may exclude the partial video. When it is determined that the action of the object does not correspond to the preset motion in operation 543, the processor 150 may exclude the partial video. Through this, when the relay voice corresponding to the partial video does not include contents related to a current partial video but contents related to a previous event, the processor 150 may exclude the partial video.

In this manner, the computer system 100 may detect at least one target video and provide the target video for a user. According to an example embodiment, the processor 150 may provide an individual target video. According to another example embodiment, the processor 150 may combine a plurality of target videos into, for example, a highlight video and may provide the same.

Figure 6:
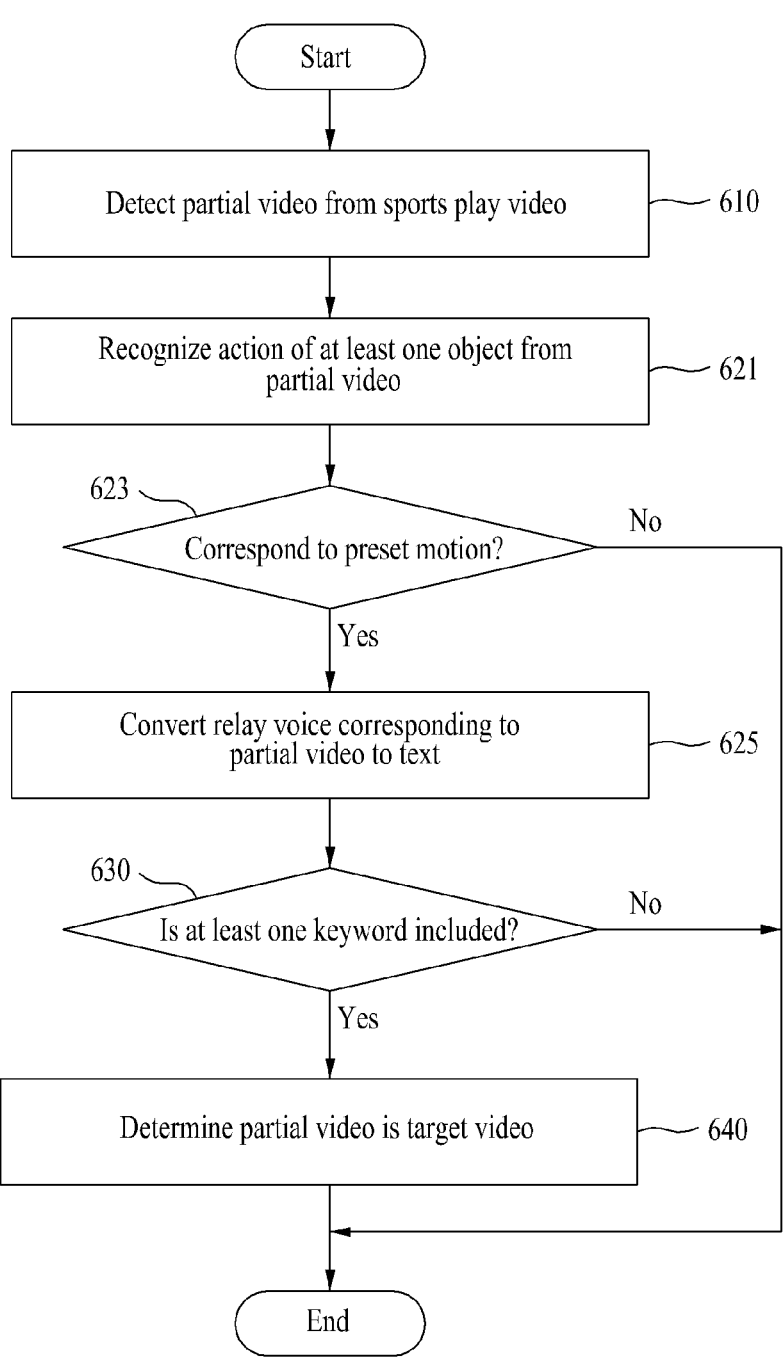
FIG. 6 is a flowchart illustrating an example of a method of a computer system for detecting a target video from a sports video according to yet another example embodiment.

FIG. 6 is a flowchart illustrating an example of a method of the computer system 100 according to the third example embodiment. According to the third example embodiment, the processor 150 of the computer system 100 may be configured as illustrated in FIG. 3.

Referring to FIG. 6, in operation 610, the computer system 100 of the third example embodiment may detect a partial video from a sports video of a sports game. Here, operation 610 of the third example embodiment is substantially similar to operation 410 of the first example embodiment and thus, further description is omitted.

According to the third example embodiment, the computer system 100 may verify again whether the partial video is appropriate as the target video in multiple manners. This is because a relay voice corresponding to the partial video may include contents related to a previous event not contents related to a current partial video. For example, when the sports game is baseball and the preset event is a notable defensive play, the relay voice may include contents related to a previous notable defensive play by an announcer or a commentator.

In detail, in operation 621, the computer system 100 may recognize an action of at least one object from the partial video. For example, the object may include a person or a thing. For example, when the sports game is baseball, the processor 150 may recognize an action of at least one of a pitcher, a batter, a first baseman, a second baseman, a shortstop, a third baseman, a right fielder, a center fielder, and a left fielder. In detail, the processor 150 may identify each object from the partial video and may track an action of the object. For example, the processor 150 may recognize an action of the object using an AI module or a rule-based algorithm, such as a TensorFlow object detection model.

In operation 623, the computer system 100 may primarily verify whether the partial video is appropriate as the target video related to the preset event. In detail, the processor 150 may determine whether the action of the object corresponds to a preset motion. For example, the processor 150 may determine whether a combination of actions of objects corresponds to the preset motion. Here, a preset range of motion in the third example embodiment may be identical to or different from that in the second example embodiment. Here, the preset range of motion in the third example embodiment may be defined in more detail and the preset range of motion in the second example embodiment may be defined in less detail.

When the partial video is determined to be appropriate as the target video in operation 623, the computer system 100 may convert the relay voice corresponding to the partial video to text in operation 625. In detail, when it is determined that the action of the object corresponds to the preset motion in operation 623, the processor 150 may extract the relay voice corresponding to the partial video. In operation 630, the computer system 100 may finally verify whether the partial video is appropriate as the target video related to the preset event. In detail, the processor 150 may determine whether the text converted from the relay voice includes a preset number of keywords. Here, the preset number may be 1 or more. Here, operations 625 and 630 of the third example embodiment are substantially similar to operations 420 and 430 of the first example embodiment and thus, further description is omitted.

When it is determined that the text includes the preset number of keywords in operation 630, the processor 150 may determine that the partial video is the target video. Through this, only when the relay voice corresponding to the partial video includes contents related to the preset event and also the action of the object represents the motion related to the preset event, the processor 150 may detect the partial video as the target video.

When it is determined that the action of the object does not correspond to the preset motion in operation 623, the processor 150 may exclude the partial video. When it is determined that the text does not include the preset number of keywords in operation 630, the processor 150 may exclude the partial video. Through this, when the relay voice corresponding to the partial video includes contents not related to a current partial video but contents related to a previous event, the processor 150 may exclude the partial video.

In this manner, the computer system 100 may detect at least one target video and provide the target video for a user. According to an example embodiment, the processor 150 may provide an individual target video. According to another example embodiment, the processor 150 may combine a plurality of target videos into, for example, a highlight video and may provide the same.

According to at least one example embodiment, the target video may be detected from the sports video with high accuracy. That is, the computer system 100 may exhibit higher accuracy than using only an action recognition by using voice recognition in detecting the target video for the preset event. For example, when the sports game is baseball and the preset event is a notable defensive play, the notable defensive play needs to represent a play that most people may accept as being exceptional or noteworthy and an unremarkable defensive play should not be included as a notable defensive play. Here, if a performance index for the target video is expressed as F1 score, the F1 score is verified to be about 0.4 or less in the case of using only the action recognition and the F1 score is verified to be about 0.6 or more in the case of using the voice recognition. That is, in the case of using only the action recognition, an unremarkable defense may be recognized as a notable play or there may be many errors where a notable defense is excluded. In contrast, in the case of using the voice recognition, such errors are significantly reduced. In addition, the computer system 100 may exhibit higher accuracy by using a combination of the voice recognition and the action recognition in detecting the target video for the preset event. Therefore, user demands that desire a target video may be met with higher satisfaction.

The method of the computer system 100 according to at least one example embodiment may include converting a relay voice corresponding to a sports video to text during a sports game (operation 420, 520, 625); and detecting a target video related to a preset event from the sports video based on the text (operation 440, 545, 640).

According to at least one example embodiment, the converting of the relay voice to the text (operation 420, 520, 625) may include detecting a partial video from the sports video (operation 410, 510, 610); and converting a relay voice corresponding to the partial video to text (operation 420, 520, 625).

According to at least one example embodiment, the detecting of the target video (operation 440, 545, 640) may include detecting the partial video as the target video (operation 440, 545, 640) when the text includes at least one keyword related to the event (operation 430, 530, 630).

According to an example embodiment, the detecting of the partial video as the target video (operation 545) may include recognizing an action of at least one object from the partial video (operation 541) when the text includes the keyword (operation 530); and detecting the partial video as the target video (operation 545) when the action is related to the event (operation 543).

According to another example embodiment, the converting of the relay voice corresponding to the partial video to the text (operation 625) may include recognizing an action of at least one object from the partial video (operation 621); and converting the relay voice corresponding to the partial video to the text (operation 625) when the action is related to a preset event (operation 623).

According to at least one example embodiment, the detecting of the partial video (operation 410, 510, 610) may include detecting the partial video from the sports video based on text relay data.

According to at least one example embodiment, the detecting of the partial video (operation 410, 510, 610) may include recognizing a score board of the sports video and mapping the text relay data and the sports video; and detecting the partial video from a location in the sports video that is determined based on the text relay data.

According to at least one example embodiment, the sports game may be baseball and the event may include a notable defensive play.

According to at least one example embodiment, the detecting of the partial video (operation 410, 510, 610) may include detecting the partial video related to an out play from the sports video.

The computer system 100 according to at least one example embodiment may include the memory 140; and the processor 150 configured to connect to the memory 140 and to execute at least one instruction stored in the memory 140. The processor 150 is configured to convert a relay voice corresponding to a sports video to text during a sports game, and to detect a target video related to a preset event from the sports video based on the text.

According to at least one example embodiment, the processor 150 may be configured to detect a partial video from the sports video, and to convert a relay voice corresponding to the partial video to text.

According to at least one example embodiment, the processor 150 may be configured to detect the partial video as the target video when the text includes at least one keyword related to the event.

According to at least one example embodiment, the processor 150 may be configured to recognize an action of at least one object from the partial video when the text includes the keyword, and to detect the partial video as the target video when the action is related to the event.

According to at least one example embodiment, the processor 150 may be configured to recognize an action of at least one object from the partial video, and to convert the relay voice corresponding to the partial video to the text when the action is related to a preset event.

According to at least one example embodiment, the processor 150 may be configured to detect the partial video from the sports video based on text relay data.

According to at least one example embodiment, the processor 150 may be configured to recognize a score board of the sports video and map the text relay data and the sports video, and to detect the partial video from a location in the sports video that is determined based on the text relay data.

According to at least one example embodiment, the sports game may be baseball and the event may include a notable defensive play.

According to at least one example embodiment, the processor 150 may be configured to detect the partial video related to an out play from the sports video.

The apparatuses described herein may be implemented using hardware components, software components, and/or a combination of hardware components and software components. For example, the apparatuses and components described herein may be implemented using one or more general-purpose or special purpose computers, or a processing device, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or at least one combination thereof, for independently or collectively instructing or configuring the processing device to operate as desired. Software and/or data may be embodied permanently or temporarily in any type of machine, component, physical equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be implemented in a form of a program instruction performed through various computer methods and may be recorded in non-transitory computer-readable recording media. Here, the media may continuously store programs executable by a computer or may temporally store the same for execution or download. The media may be various record devices or storage devices in a form in which one or a plurality of hardware components is coupled and may be distributed in a network. Examples of the media include magnetic media such as hard disks, floppy disks, and magnetic tapes; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, etc., that supplies and distributes other various types of software.

The term "module" used herein may include a unit configured as hardware, software, or firmware, and may be interchangeably used with, for example, the terms "logic," "logic block," "part," "circuit," etc. The module may be an integrally configured part, a minimum unit that performs at least one function, or a portion thereof. For example, the module may be configured as an application-specific integrated circuit (ASIC).

According to at least one example embodiment, each component (e.g., module or program) among the aforementioned components may include a singular entity or a plurality of entities. According to at least one example embodiments, at least one component among the aforementioned components or at least one operation may be omitted, or at least one another component or operation may be added. Alternately or additionally, the plurality of components (e.g., modules or programs) may be integrated into a single component. In this case, the integrated component may perform the same or similar functionality as being performed by a corresponding component among the plurality of components before integrating at least one function of each component of the plurality of components. According to at least one example embodiment, operations performed by a module, a program, or another component may be performed sequentially, in parallel, repeatedly, or heuristically, or at least one of the operations may be performed in different order or omitted. Alternatively, at least one another operation may be added.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of detecting a target video within a sports video, the method comprising:

extracting, by a processor, chunk videos from the sports video, wherein each of the chunk videos is based on a predetermined time unit defined by a unit of time;

generating a partial video from at least one of the chunk videos within a sports video of a sports game based on text relay data of the sports game by recognizing a score board from each of the chunk videos and mapping the text relay data to the chuck videos, wherein the partial video includes an audio signal and a noise signal;

extracting a relay voice from the audio signal of the partial video by removing the noise signal using a noise filter;

converting the relay voice of the partial video to text;

excluding the partial video as the target video without recognizing an action of at least one object from the partial video, when the text in the partial video does not include a preset number of keywords;

determining that the partial video is the target video when the text includes the preset number of keywords; and in response to the determining that the text includes the preset number of keywords, confirming that the partial video is the target video by:

recognizing the action of the at least one object from the partial video; and determining that the action of the at least one object corresponds to a preset motion related to an event.

2. The method of claim 1, wherein the detecting of the target video comprises determining the partial video is the target video when the text includes at least one keyword related to a preset event.

3. The method of claim 2, wherein the detecting of the partial video as the target video comprises:

recognizing an action of at least one object from the partial video when the text includes the at least one keyword; and determining the partial video is the target video when the action is related to the preset event.

4. The method of claim 1, wherein the converting of the relay voice corresponding to the partial video to the text comprises:

recognizing an action of at least one object from the partial video; and converting the relay voice corresponding to the partial video to the text when the action is related to the preset event.

5. The method of claim 1, wherein the generating of the partial video comprises:

detecting the partial video from a location in the sports video that is determined based on the text relay data, wherein the text relay data includes identification information and timestamp information for each event that occurs in the sports game.

6. The method of claim 1 wherein the detecting of the partial video comprises detecting the partial video related to a play involving an out from a baseball game.

7. A non-transitory computer-readable recording medium storing instructions that, when executed by the processor, cause the processor to perform the method of claim 1.

8. A computer system comprising:

a memory; and a processor configured to connect to the memory and to execute at least one instruction stored in the memory, wherein the processor is configured to:

extract chunk videos from a sports video of a sports game, wherein each of the chunk videos is based on a predetermined time unit defined by a unit of time;

generate a partial video from at least one of the chunk videos based on text relay data of the sports game by recognizing a score board from each of the chuck videos and mapping the text relay data to the chunk videos, wherein the partial video includes an audio signal and a noise signal;

extract a relay voice from the audio signal of the partial video by removing the noise signal using a noise filter;

convert the relay voice of the partial video to text, and exclude the partial video as the target video without recognizing an action of at least one object from the partial video, when the text in the partial video does not include a preset number of keywords;

determine that the partial video is the target video when the text includes the preset number of keywords;

in response to the determining that the text includes the preset number of keywords, confirming that the partial video is the target video by:

recognizing the action of the at least one object from the partial video; and determining that the action of the at least one object corresponds to a preset motion related to an event.

9. The computer system of claim 8, wherein the processor is configured to determine that the partial video is the target video when the text includes at least one keyword related to a preset event.

10. The computer system of claim 9, wherein the processor is configured to recognize an action of at least one object from the partial video when the text includes the at least one keyword, and to determine that the partial video is the target video when the action is related to the preset event.

11. The computer system of claim 8, wherein the processor is configured to recognize an action of at least one object from the partial video, and to convert the relay voice corresponding to the partial video to the text when the action is related to the preset event.

12. The computer system of claim 8, wherein the processor is configured to detect the partial video from a location in the sports video that is determined based on the text relay data, wherein the text relay data includes identification information and timestamp information for each event that occurs in the sports video.

13. The computer system of claim 8, wherein the processor is configured to detect the partial video related to a play involving an out from a baseball game.

14. The method of claim 1, wherein the partial video is detected as the target video by:

determining whether the text includes at least one keyword related to the event;

recognizing the action of at least one object from the partial video in response to the determination that the text includes the keyword related to the event;

determining that the action corresponds to the preset motion related to the event; and confirming the partial video as the target video.

15. The method of claim 1, wherein the text relay data includes identification information and timestamp information for each event that occurs in the sports game.

16. The method of claim 1, further comprising verifying that the partial video is the target video after determining that the partial video is the target video.

17. The computer system of claim 8, wherein the process verifies that the partial video is the target video after determining that the partial video is the target video.

* * * * *